(12) United States Patent
Lee et al.

(10) Patent No.: US 10,951,077 B2
(45) Date of Patent: *Mar. 16, 2021

(54) ROTOR AND MOTOR HAVING THE SAME

(71) Applicant: LG INNOTEK CO., LTD., Seoul (KR)

(72) Inventors: Jong Chan Lee, Seoul (KR); Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,406

(22) Filed: Dec. 5, 2019

(65) Prior Publication Data

US 2020/0112208 A1    Apr. 9, 2020

Related U.S. Application Data

(63) Continuation of application No. 15/216,333, filed on Jul. 21, 2016, now Pat. No. 10,530,202.

(30) Foreign Application Priority Data

Jul. 21, 2015 (KR) .......................... 10-2015-0103176

(51) Int. Cl.
*H02K 1/24* (2006.01)
*H02K 3/52* (2006.01)

(52) U.S. Cl.
CPC ................ *H02K 1/24* (2013.01); *H02K 3/527* (2013.01)

(58) Field of Classification Search
CPC .......... H02K 1/148; H02K 3/32; H02K 3/325; H02K 3/34; H02K 3/345; H02K 1/24–1/246; H02K 1/26–1/265

USPC ................................ 310/194, 195, 214, 215
See application file for complete search history.

(56) References Cited

U.S. PATENT DOCUMENTS

| 10,530,202 B2 * | 1/2020 | Lee .......................... H02K 1/24 |
| 2003/0006663 A1 | 1/2003 | Hsu |
| 2004/0113511 A1 | 6/2004 | Schmidt |

(Continued)

FOREIGN PATENT DOCUMENTS

| CN | 1774849 | 5/2006 |
| JP | 58-069444 | 4/1983 |

OTHER PUBLICATIONS

Chinese Office Action dated May 21, 2019 issued in CN Application No. 201610581369.5.

*Primary Examiner* — Thomas Truong
(74) *Attorney, Agent, or Firm* — KED & Associates LLP

(57) ABSTRACT

A rotor may include a first rotor core and a second rotor core. The first rotor core includes a first core body and a first teeth protruding from an outer circumferential surface of the first core body, and the second rotor core includes a second core body and a second teeth protruding from an outer circumferential surface of the second core body. Each of the first teeth includes a first extension protruding axially in a first direction, and each of the second teeth includes a second extension protruding axially in a second direction opposite the first direction. The first extension includes a first protrusion provided on a first inner circumferential surface of the first extension, and the second extension includes a second protrusion provided on a second inner circumferential surface of the second extension.

11 Claims, 16 Drawing Sheets

(56) References Cited

U.S. PATENT DOCUMENTS

| | | | |
|---|---|---|---|
| 2004/0164639 A1* | 8/2004 | Yamamoto | H02K 3/18 310/216.012 |
| 2005/0206264 A1* | 9/2005 | Yamamoto | H02K 13/04 310/216.001 |
| 2008/0018197 A1* | 1/2008 | Yamamoto | H02K 15/022 310/268 |
| 2014/0015349 A1 | 1/2014 | Chamberlin | |
| 2014/0159540 A1 | 6/2014 | Kim et al. | |

* cited by examiner

ROTOR AND MOTOR HAVING THE SAME

CROSS-REFERENCE TO RELATED APPLICATION

This application is a Continuation of U.S. application Ser. No. 15/216,333, filed Jul. 21, 2016, which claims priority under 35 U.S.C. § 119 to Korean Patent Application No. 10-2015-0103176, filed on Jul. 21, 2015, whose entire disclosures are incorporated herein by reference in their entirety.

BACKGROUND

1. Field

Embodiments relate to a rotor and a motor having the same.

2. Background

A vehicle includes a starter motor which drives an engine and an alternator which generates electricity using a rotational force of the engine. The starter motor has an ignition switch which is connected to a power supply of a battery by an operation of a driver when the vehicle is started, power is supplied to the starter motor through the connection, and the vehicle is started by the engine being rotated by a driving force generated by the starter motor. In comparison, an alternating current (AC) power is generated by the alternator being connected to a driving unit of the engine to rotate a rotor while a magnetic field is formed by a driving force of the engine, and thus the battery is charged using a rectifier or the like.

Since both of the starter motor and the alternator are configured in a stator-rotor structure, structures of the starter motor and the alternator are very similar to each other and can be operated as a power generator or a motor depending on whether a force or power is applied. Recently, a belt driven starter generator (BSG) capable of functioning as a starter motor and an alternator with a single structure is actively being studied.

A wound rotor synchronous motor is a motor having teeth which protrude from an outer circumferential surface of a rotor core and around which a coil is wound. The wound rotor synchronous motor has not only been mainly used as a generator but has also been recently proposed as a form of a traction motor since a development of a rare earth-free motor has been spotlighted.

However, a motor has to increase its number of coils or current to increase its torque. However, in the case of a BSG, there is a problem in that an increase in a torque of the motor is limited because there is a limit in increasing the number of wound coils due to spatial constraints and in increasing a current due to a current limit.

Also, an inlet through which a nozzle is inserted into a winding space is formed between teeth of a rotor that are adjacent to each other to perform winding, and coils wound through the inlet may deviate therefrom, and thus the space should be closed with a separate member after the winding. Therefore, there is a problem in which manufacturing time and manufacturing costs are increased

BRIEF DESCRIPTION OF THE DRAWINGS

The embodiments will be described in detail with reference to the following drawings in which like reference numerals refer to like elements wherein.

DETAILED DESCRIPTION

Figure 1:
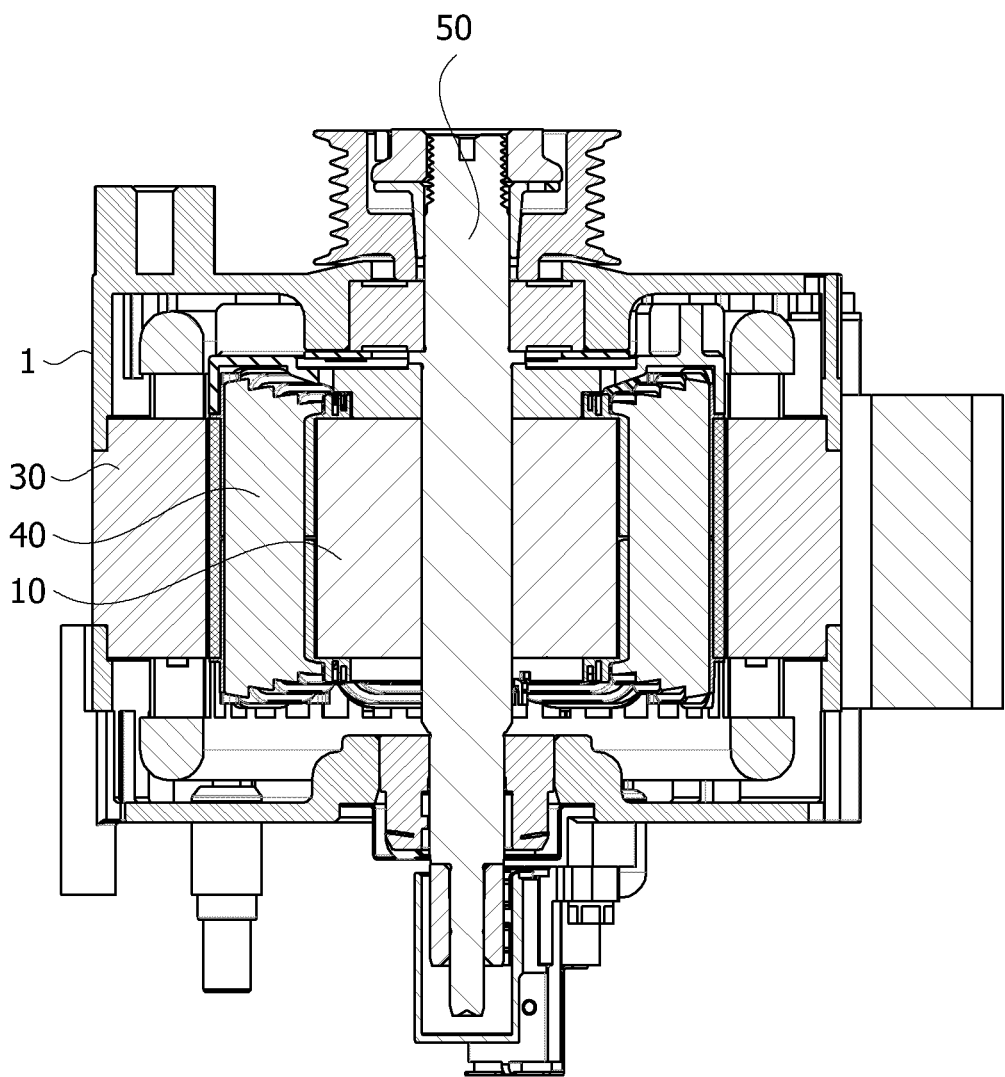
FIG. 1 is a view illustrating a motor according to an embodiment of the present invention.

FIG. 1 is a view illustrating a motor according to an embodiment.

Referring to FIG. 1, a motor may include a stator 30 in a housing 1. A rotor 10 is included in the stator 30, and a coil 40 may be wound around the rotor 10. The coil 40 may induce an electrical interaction with the stator 30 to rotate the rotor 10 or induce power by the rotating rotor 10.

Specifically, when the motor operates as a starter motor, the rotor 10 is rotated by an applied driving current to rotate a pulley belt (not shown) connected to a rotating shaft 50 of the rotor 10, and an external component (an engine and the like) may be operated. Here, in the case of a vehicle, the pulley belt may be connected to a crankshaft of an engine.

Conversely, when the motor operates as an alternator, the pulley belt (not shown) is rotated by an operation of an engine to rotate the rotor 10, and an alternating current (AC) is generated. The generated AC may be supplied to an external component (a battery and the like) by being converted into a direct current (DC).

Figure 2:
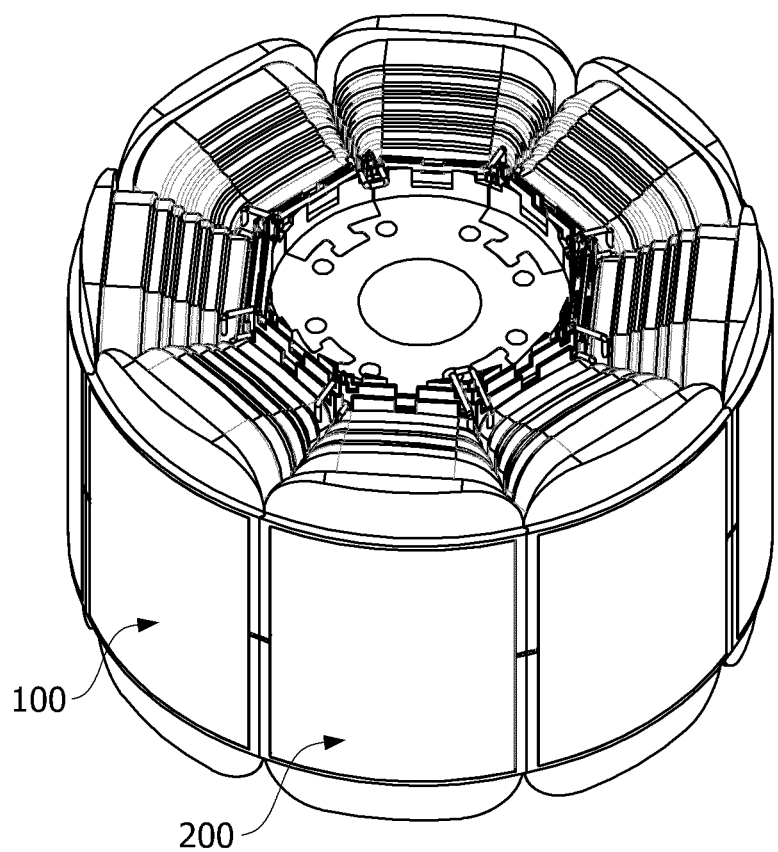
FIG. 2 is a view illustrating a rotor shown in FIG. 1.
Figure 3:
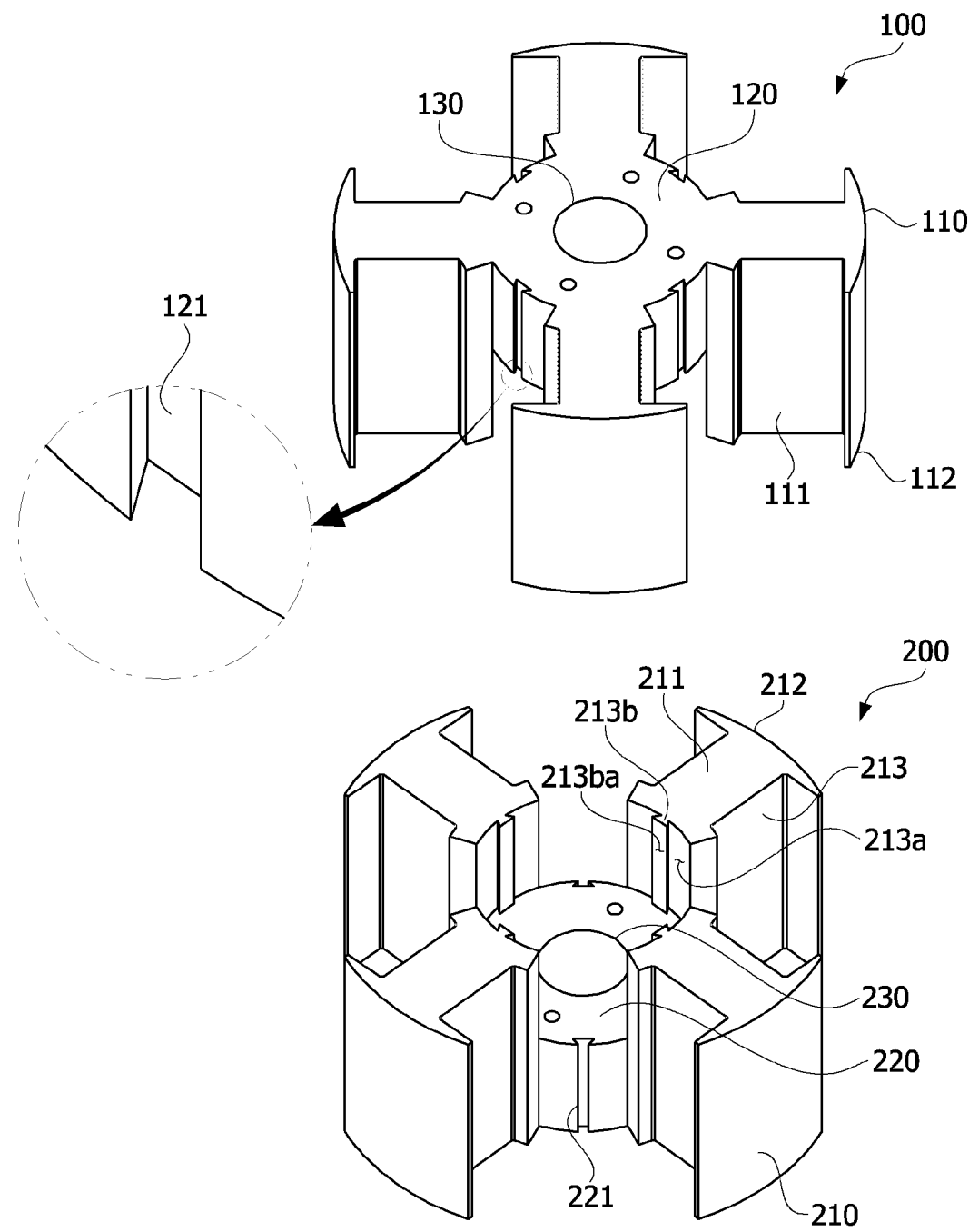
FIG. 3 is a view illustrating a first rotor core and a second rotor core.

FIG. 2 is a view illustrating the rotor shown in FIG. 1, and FIG. 3 is a view illustrating a first rotor core and a second rotor core. FIGS. 2 and 3 clearly illustrate only main characteristic portions for conceptually and clearly understanding the present invention. As a result, various modifications of the illustration are expected, and it is not necessary that the scope of the present invention be limited to specific shapes illustrated in the drawings.

As shown in FIGS. 2 and 3, the rotor 10 according to an embodiment may include a first rotor core 100 and a second rotor core 200. The first rotor core 100 and the second rotor core 200 form the rotor by being mutually stacked in a height direction. Each of the first rotor core 100 and the second rotor core 200 may be formed by stacking a plurality of plates. In this case, the first rotor core 100 is illustrated as being coupled onto the second rotor core 200.

Referring to FIG. 3, the first rotor core 100 may include first teeth 110. The first teeth 110 protrude from an outer circumferential surface of the first rotor core 100 in a radial direction. Coils are wound around the first teeth 110, and insulators may be installed on the first teeth 110. Here, the first teeth 110 may be disposed in a circumferential direction of a core body 120 in a cylindrical shape at regular intervals. A hole 130 into which the rotating shaft 50 is inserted may be formed in the center of the core body 120.

The first teeth 110 may include an arm-type body 111 connected to the core body 120 and a blocking protrusion 112 formed at a front end of the arm-type body 111. A coil is wound around the arm-type body 111. As shown in FIG. 3, all four of the first teeth 110 may be disposed at regular intervals. The number of the first teeth 110 may vary depending on the number of poles of the motor.

The second rotor core 200 may include second teeth 210. The second teeth 210 protrude from an outer circumferential surface of the second rotor core 200 in the radial direction. Further, the second teeth 210 may be disposed in a circumferential direction of a core body 220 in a cylindrical shape at regular intervals. A hole 230 into which the rotating shaft 50 is inserted may be formed in the center of the core body 220.

The second teeth 210 have the same shape as the shape of the first teeth 110. The second teeth 210 may include an arm-type body 211 connected to the core body 220 and a blocking protrusion 212 formed at a front end of the arm-type body 211. As shown in FIG. 3, all four of the second teeth 210 may be disposed at regular intervals. The number of the second teeth 210 may vary depending on the number of poles of the motor.

The first rotor core 100 and the second rotor core 200 are disposed so that the first rotor core 100 is disposed at a higher level than the second rotor core 200 and the second rotor core 200 is disposed at a lower level than the first rotor core 100 with respect to an axial center, and thus the respective teeth 110 and 210 may be stacked and coupled to each other in a complementary state.

Meanwhile, a first insulator 300 may be installed at the first teeth 110 for insulation. In addition, a second insulator 400 may also be installed at the second teeth 210 for insulation.

The first insulator 300 and the second insulator 400 serve to insulate so that coils wound around the first teeth 110 and the second teeth 210 are not conductive with the rotor 10. The first insulator 300 and the second insulator 400 may be formed of a resin material.

Figure 4:
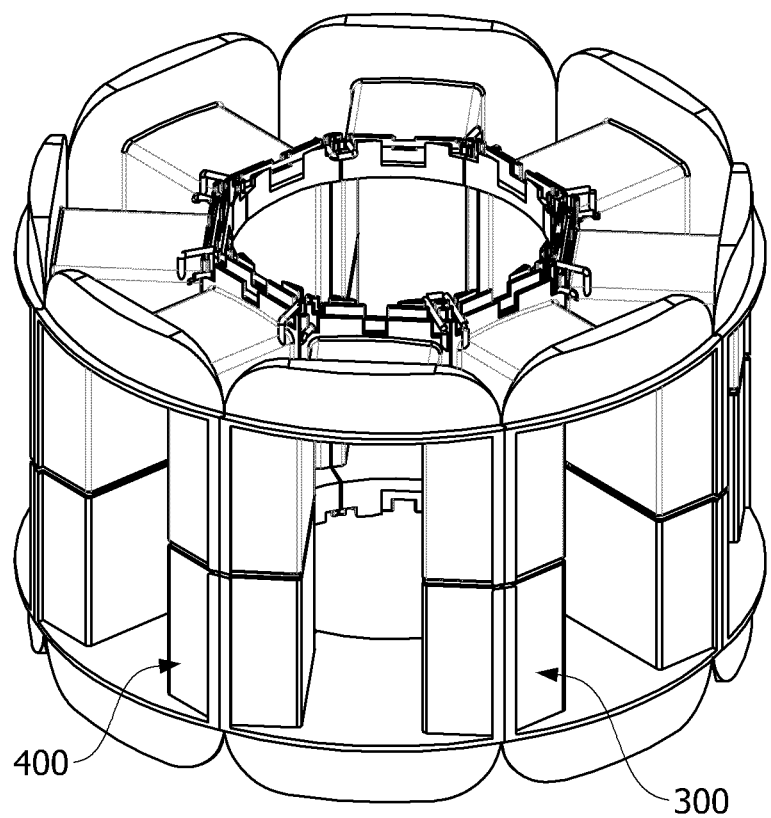
FIG. 4 is a view illustrating a first insulator and a second insulator.
Figure 5:
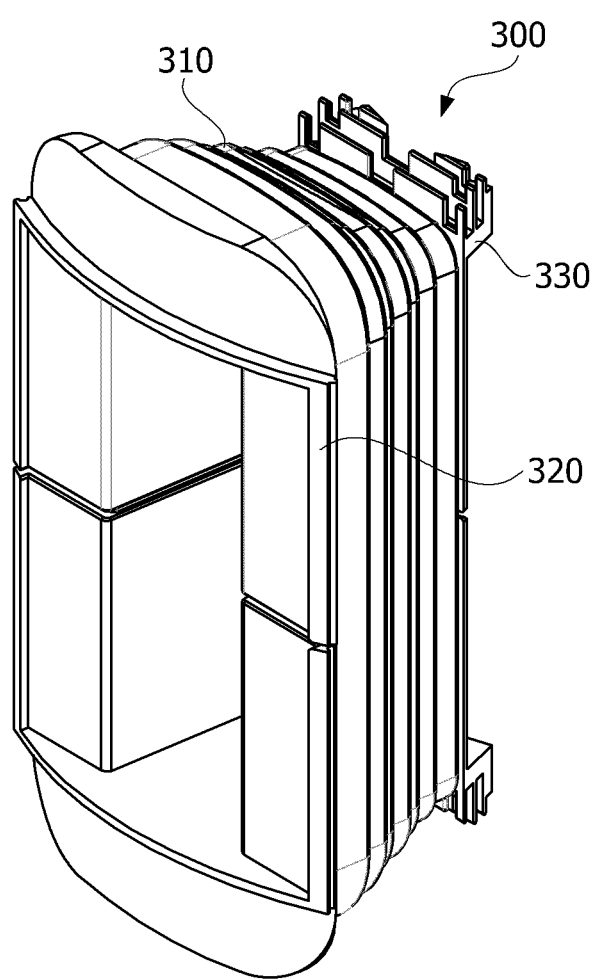
FIG. 5 is a view illustrating the first insulator.

FIG. 4 is a view illustrating a first insulator and a second insulator, and FIG. 5 is a view illustrating the first insulator.

Referring to FIGS. 4 and 5, the first insulator 300 may include a body 310, an outer guide 320, and an inner guide 330. The body 310 surrounds the first rotor core 100. A coil may be wound around the body 310. The first outer guide 320 may be provided outside of the body 310. Also, the inner guide 330 may be provided inside of the body 310. Here, "outside" refers to the outside with respect to the body 310 in the radial direction from the center of rotation of the first rotor core 100, and "inside" refers to the inside with respect to the body 310 in the radial direction from the center of rotation of the first rotor core 100. The first outer guide 320 serves to surround end portions of the first teeth 110. The configuration of the second insulator 400 is the same as that of the first insulator 300. The second insulator 300 may also include a second outer guide 420.

Figure 6:
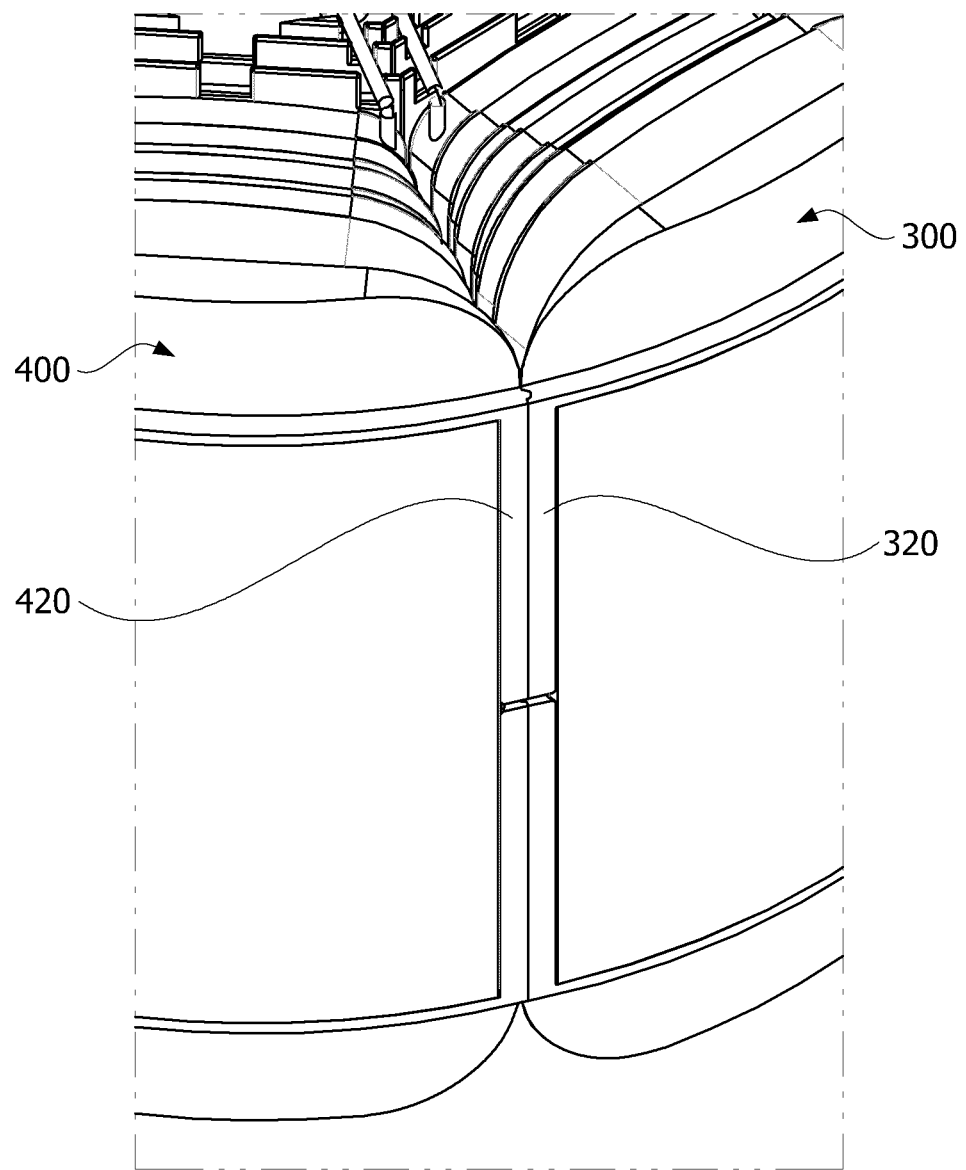
FIG. 6 is a view illustrating the first insulator and the second abutting each other.
Figure 7:
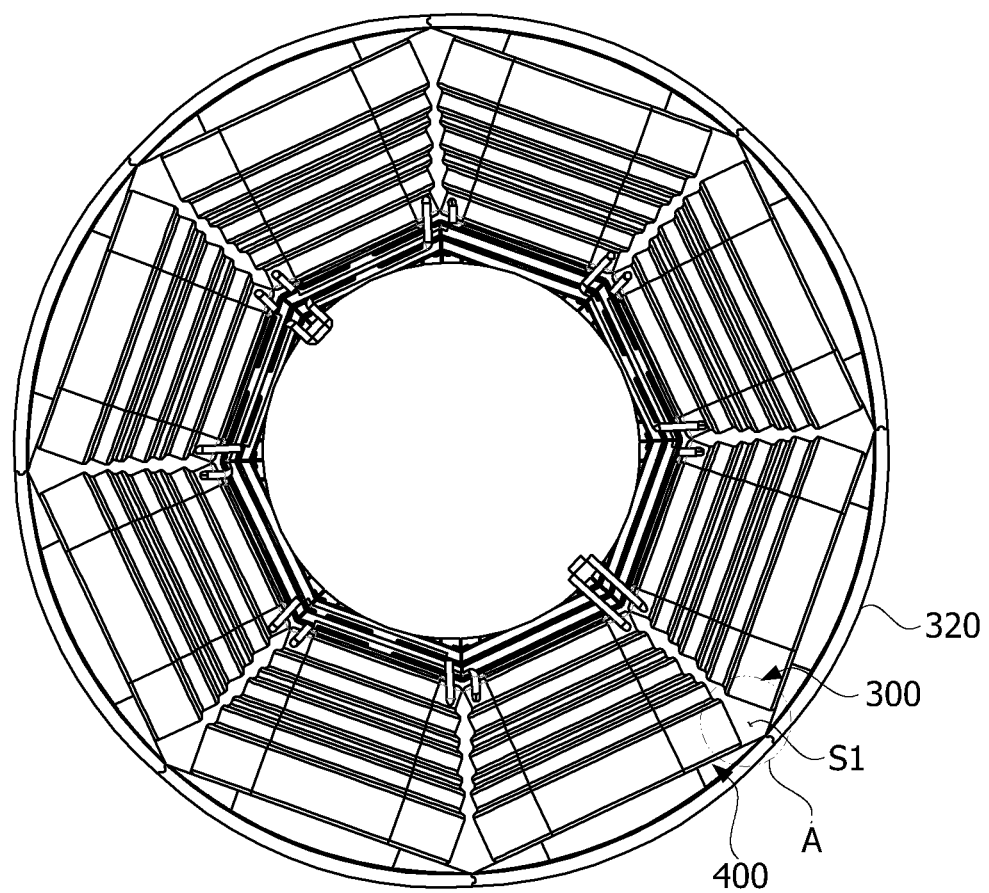
FIG. 7 is a view illustrating the first insulator and the second insulator blocking winding spaces.

FIG. 6 is a view illustrating the first insulator and the second insulator abutting each other, and FIG. 7 is a view illustrating the first insulator and the second insulator blocking winding spaces.

Referring to FIG. 6, the first outer guide 320 of the first insulator 300 and the second outer guide 420 of the second insulator 400 may be formed to abut each other. When adjacent outer guides 320 and 420 abut each other, a winding space S1 is closed as illustrated in FIG. 7.

Originally, a space needs to be secured between outer guides of adjacent insulators. This is because the space is needed for inserting a nozzle that performs winding into the winding space S1. The space is configured to be filled by a separate cover member afterwards, and a coil is prevented from deviating outside the winding space S1 by a centrifugal force according to a rotation of the rotor. However, the separate cover member has to be assembled and thus there is a problem in that time and cost for production of a product are considerably increased.

Thus, a separate cover member is omitted in the rotor and the motor having the same according to the embodiment, and the outer guides 320 and 420 of adjacent insulators are configured to abut each other as a way which prevents a coil from deviating outside the winding space S1. This is because a space into which a nozzle is inserted does not have to be secured during a winding task since the winding task of the first rotor core 100 and the winding task of the second rotor core 200 are performed separately.

Figure 8:
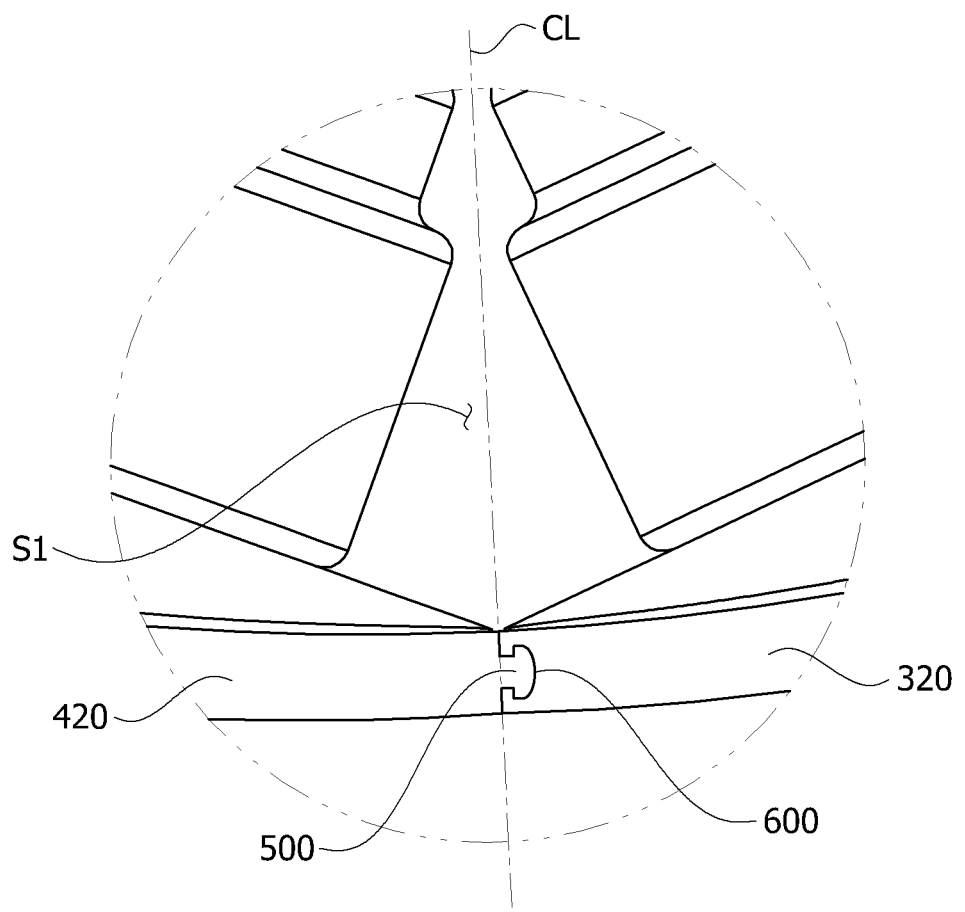
FIG. 8 is an enlarged view of region A in FIG. 7.

FIG. 8 is an enlarged view of region A in FIG. 7.

Referring to FIG. 8, side surfaces of the first outer guide 320 of the first insulator 300 and the second outer guide 420 of the second insulator 400 abut each other. Here, a convex region 500 may be formed at the side surface of the first outer guide 320 of the first insulator 300. A concave region 600 corresponding to the convex region 500 may be formed at the side surface of the second outer guide 420 of the second insulator 400.

The convex region 500 refers to a portion convexly protruding with respect to a virtual reference line CL passing through a contact surface between the first insulator 300 and the second insulator 400 in the radial direction from the center of rotation of the first rotor core 100 or the second rotor core 200, and the concave region 600 refers to a portion concavely protruding with respect to the reference line CL.

As an example of the convex region 500, a coupling protrusion 500 may be provided. In addition, a coupling slot 600 may be provided as the concave region 600. The third protrusion 500 may have a locking step structure formed at an end portion thereof, and the third groove 600 may also be formed to correspond to the locking step structure of the third protrusion 500. The third protrusion 500 may be coupled to the third groove 600 by being slid therein when the first rotor core 100 is coupled to the second rotor core 200. By an interlock between the third protrusion 500 and the third groove 600, the winding space S1 is closed, and coupling performance between the adjacent outer guides 320 and 420 is improved.

Figure 9:
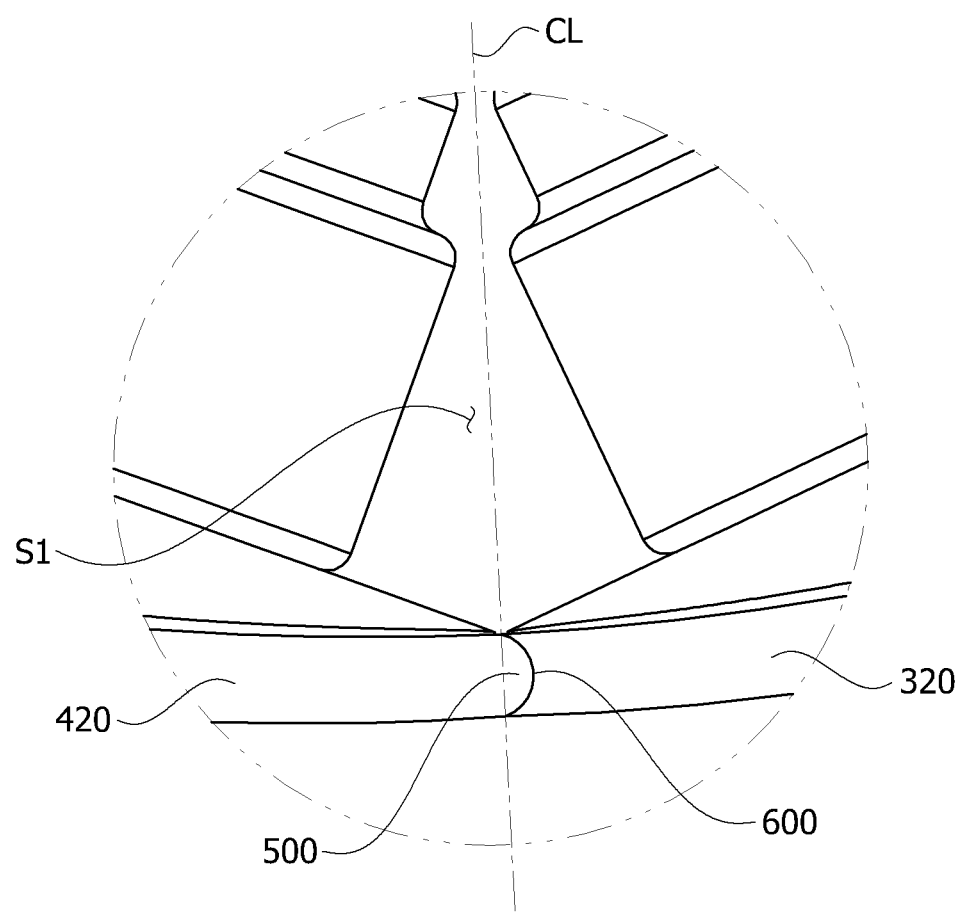
FIG. 9 is a view illustrating a first modified example of a contact surface between the first insulator and the second insulator.

FIG. 9 is a view illustrating a first modified example of a contact surface between the first insulator and the second insulator.

Referring to FIG. 9, as another example of the convex region 500, the side surface of the first insulator 300 may be convexly formed in a curved shape with respect to the reference line CL. In addition, the concave region 600 may be concavely formed corresponding to the convex region 500 in the curved shape.

Figure 10:
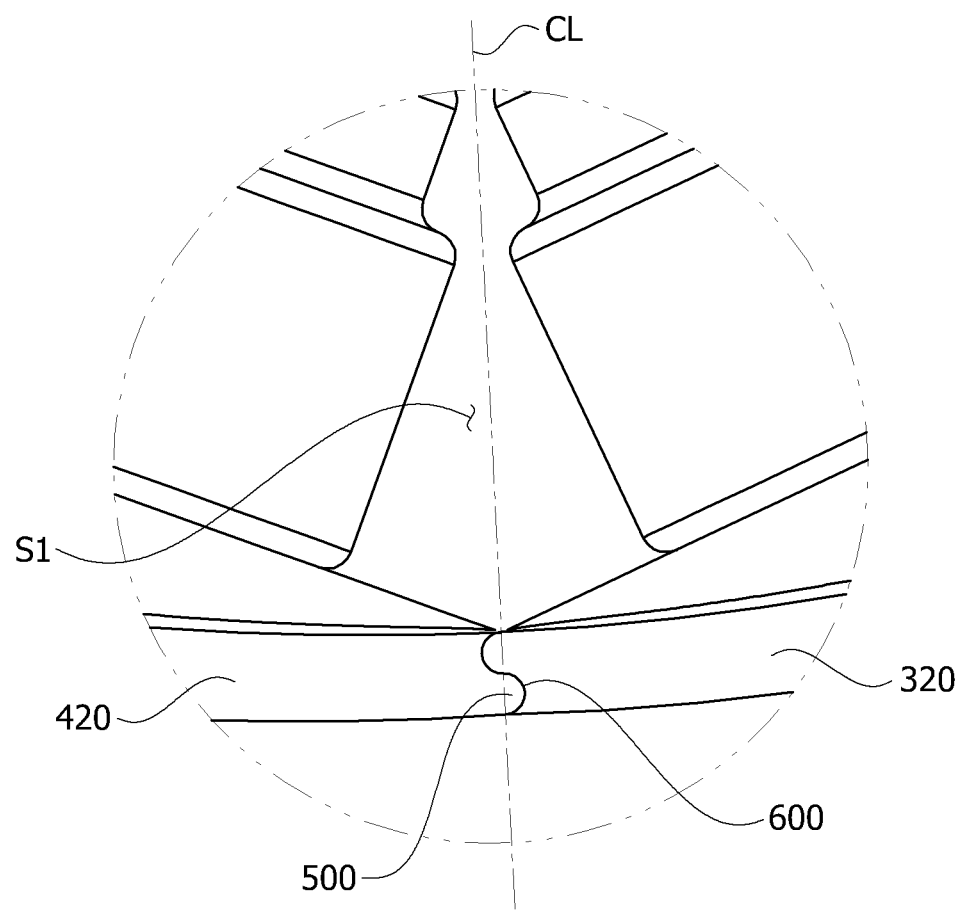
FIG. 10 is a view illustrating a second modified example of the contact surface between the first insulator and the second insulator.

FIG. 10 is a view illustrating a second modified example of the contact surface between the first insulator and the second insulator. As another example of the convex region 500 and the concave region 600, a region convexly formed in a curved shape and a region concavely formed in a curved shape with respect to the reference line CL may be alternately formed.

Figure 11:
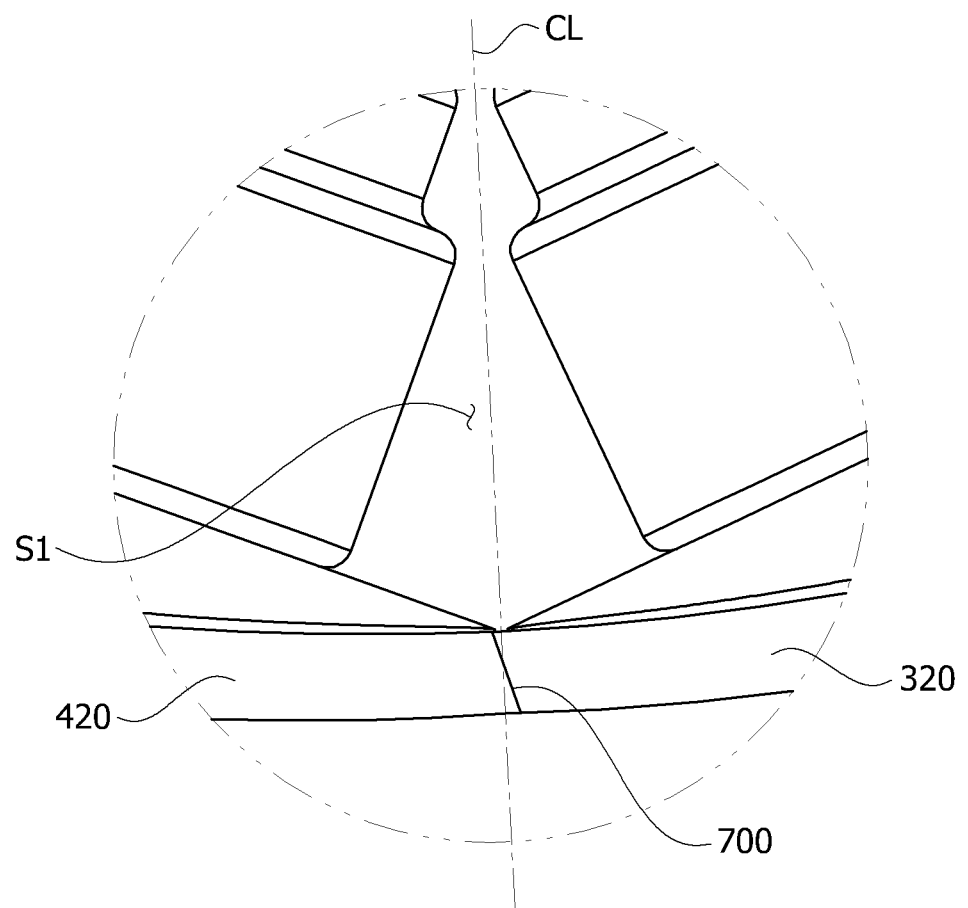
FIG. 11 is a view illustrating a third modified example of the contact surface between the first insulator and the second insulator.

FIG. 11 is a view illustrating a third modified example of the contact surface between the first insulator and the second insulator. A contact surface 700 between the first insulator 300 and the second insulator 400 may be formed to be inclined. That is, the side surfaces of the outer guides 320 and 420 may be obliquely disposed so that the contact surface 700 forms a predetermined angle with the reference line CL.

Figure 12:
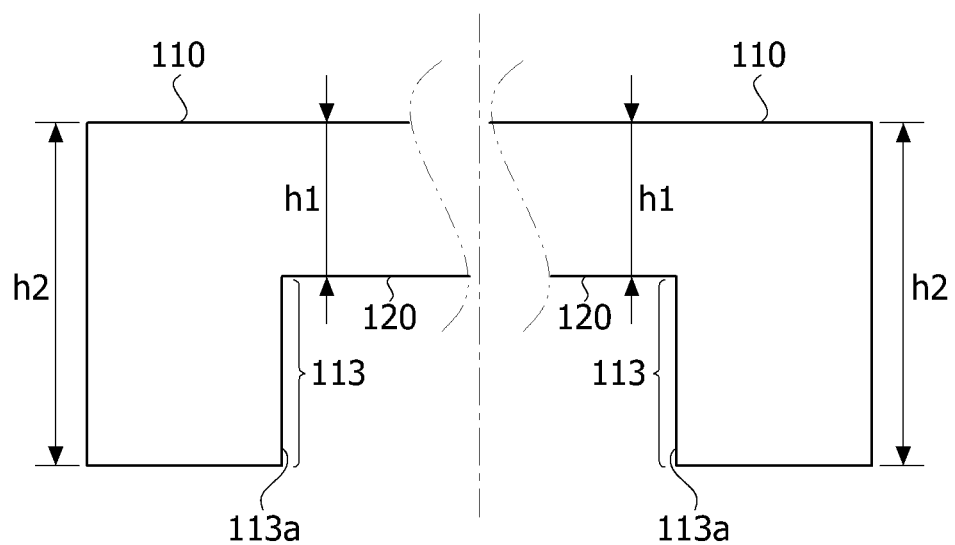
FIG. 12 is a view illustrating a first extension.
Figure 13:
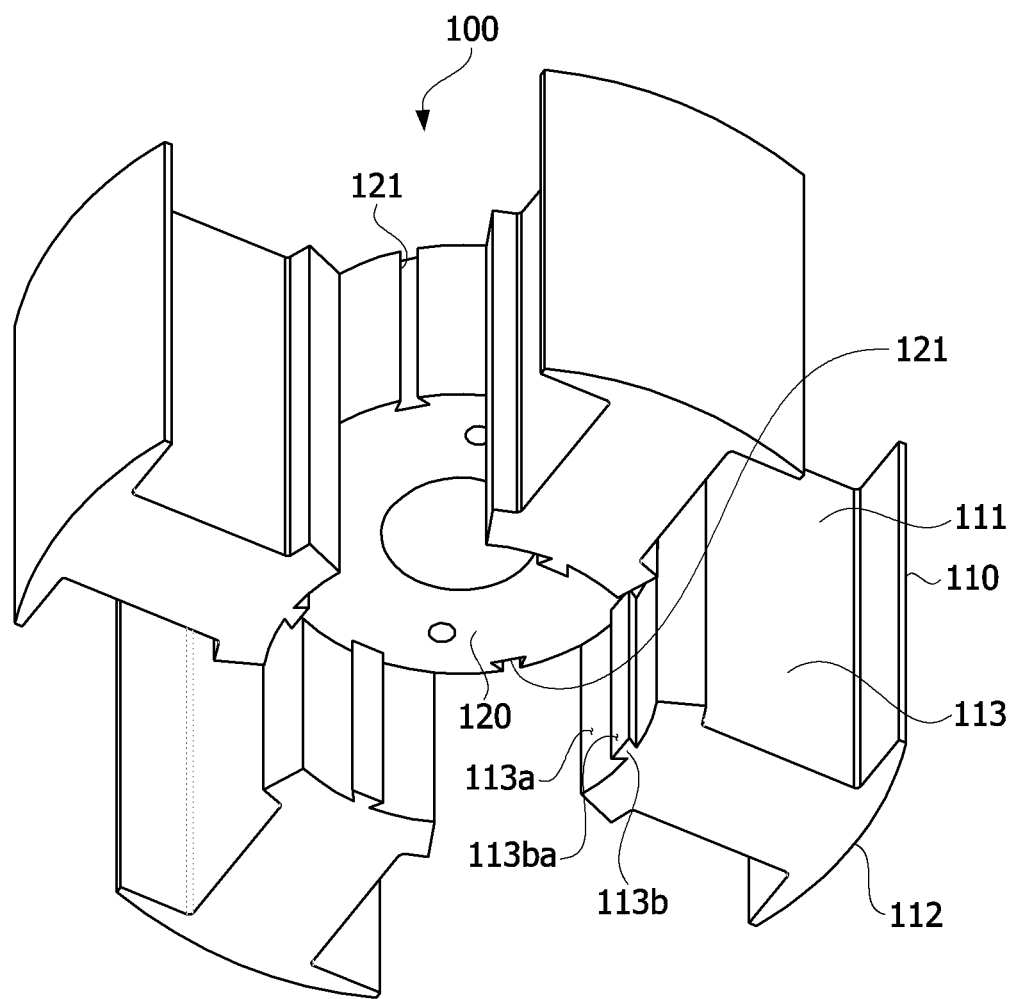
FIG. 13 is a bottom view of the first extension.

FIG. 12 is a view illustrating a first extension, and FIG. 13 is a bottom view of the first extension.

Referring to FIGS. 3, 12, and 13, a height h2 of the first teeth 110 is formed to be greater than a height h1 of the core body 120 in the cylindrical shape. Here, "height" is based on an axial direction of the motor. For example, the first teeth 110 may include a first extension 113 protruding downward past the core body 120. The first extension 113 is a portion from which the first teeth 110 extend and to which the core body 220 of the second teeth 210 is coupled.

The first extension 113 may include a first inner circumferential surface 113a aligned with an outer circumferential surface of the core body 220 of the second rotor core 200. The first inner circumferential surface 113a slidably comes into contact with the outer circumferential surface of the second core body 220.

Meanwhile, a first protrusion 113b may be formed at the first inner circumferential surface 113a in the axial direction. The first protrusion 113b has a third inner circumferential surface 113ba. The first protrusion 113b is inserted into a second groove 221 formed in the core body 220 of the second rotor core 200 so that the first rotor core 100 and the second rotor core 200 may be coupled to each other. A first groove 121 may be formed in an outer circumferential surface of the core body 120 of the first extension 113 in the axial direction.

Figure 14:
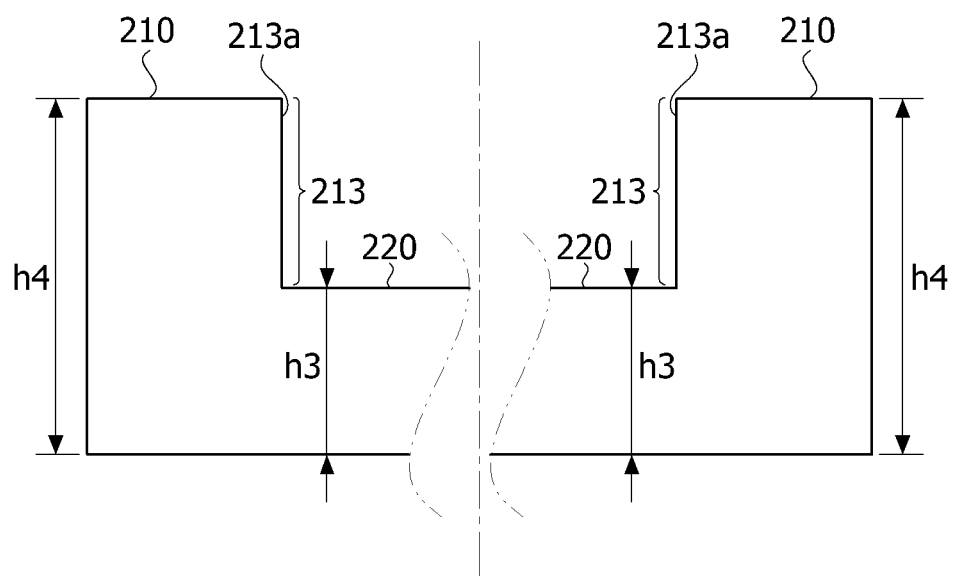
FIG. 14 is a view illustrating a second extension.

FIG. 14 is a view illustrating the second extension.

Referring to FIG. 14, a height h4 of the second teeth 210 is formed to be greater than a height h3 of the second core body 220. For example, the second teeth 210 may include a second extension 213 protruding upward past the second core body 220. The second extension 213 is a portion from which the second teeth 210 extend and to which the first core body 120 of the first teeth 110 is coupled.

Referring to FIGS. 3 and 14, the second extension 213 may include a second inner circumferential surface 213a aligned with the outer circumferential surface of the cylindrical first core body 120 of the first rotor core 100. The second inner circumferential surface 213a slidably comes in contact with the outer circumferential surface of the first core body 120 of the first teeth 110.

Figure 15:
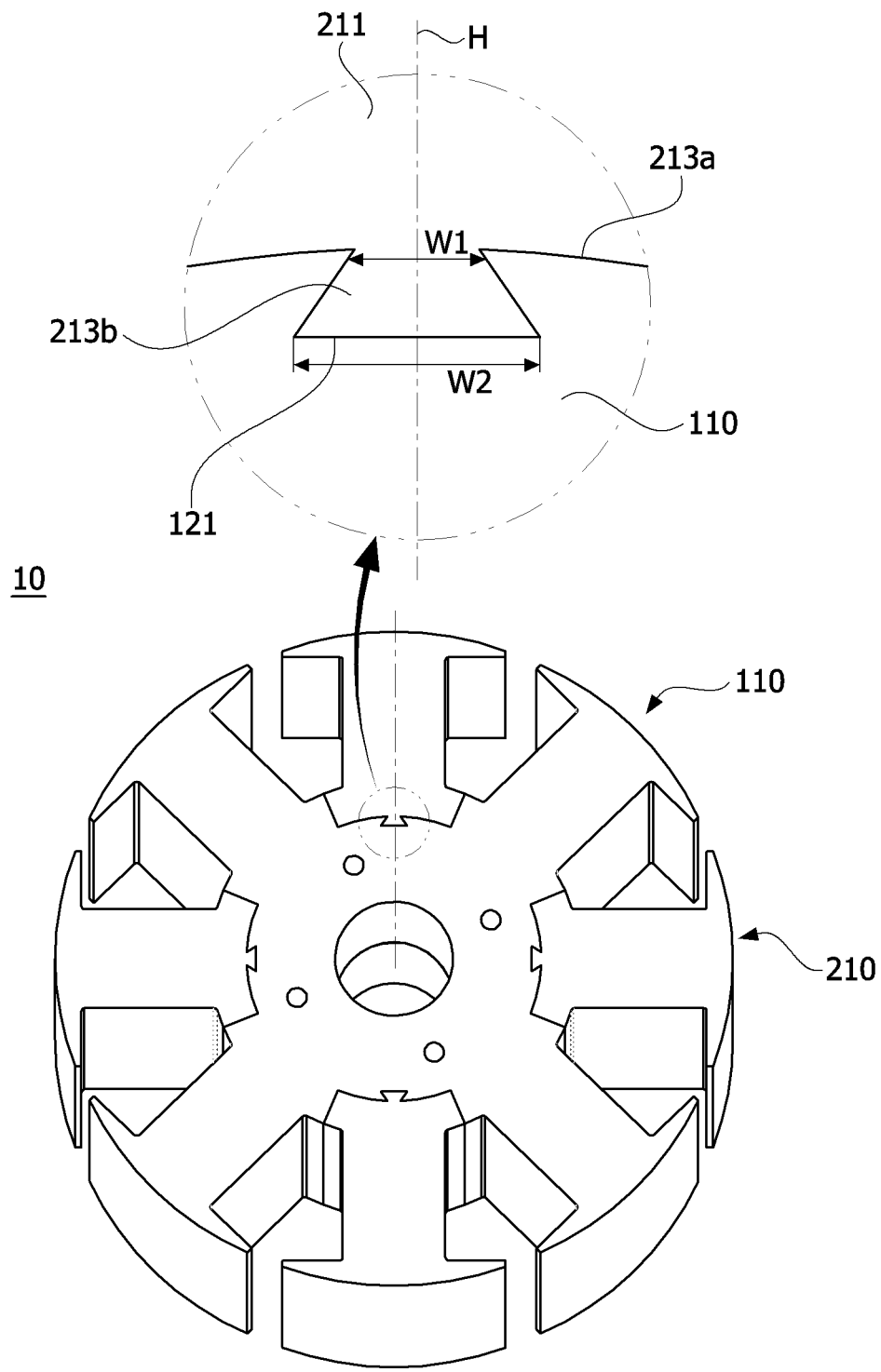
FIG. 15 is a view illustrating a rotor in which the first rotor core and the second rotor core are coupled to each other.

FIG. 15 is a view illustrating a rotor in which the first rotor core and the second rotor core are coupled to each other.

Referring to FIG. 15, a second slide protrusion 213b may be formed from the second inner circumferential surface 213a in the axial direction. The second protrusion 213b has a fourth inner circumferential surface 213ba. The second protrusion 213b is inserted into the first groove 121 formed in the cylindrical first core body 120 of the first rotor core 100 so that the first rotor core 100 and the second rotor core 200 may be coupled to each other. The second groove 221 may be formed in the outer circumferential surface of the second core body 220 of the second extension 213 in the axial direction.

The third inner circumferential surface 113ba of the first protrusion 113b, spaced apart radially inward from the second inner circumferential surface 213a of the second extension 213.

The fourth inner circumferential surface 213ba of the second protrusion 213b, spaced apart radially inward from the first inner circumferential surface 113a of the first extension 113.

Referring to FIGS. 3 and 15, the first rotor core 100 and the second rotor core 200 are coupled to form the rotor 10 so that the first teeth 110 and the second teeth 210 are alternately disposed with respect to a circumferential direction. To this end, the first teeth 110 and the second teeth 210 may be alternately disposed in the circumferential direction when the first rotor core 100 and the second rotor core 200 are coupled to each other.

As shown in FIG. 15, the second protrusion 213b of the second teeth 210 may be formed with respect a reference line H passing through the center of a width direction of the second inner circumferential surface 213a in the radial direction. Although not illustrated, the first protrusion 113b of the first protrusion 110 may also be formed with respect to a reference line passing through the center of a width direction of the first inner circumferential surface 113a in the radial direction.

The first protrusions 213a and the second protrusions 213b may be formed so that widths thereof decrease from tip end portions to root portions and may be formed so that a mutual binding force is generated between the first rotor core 100 and the second rotor core 200 with respect to the radial direction.

Figure 16:
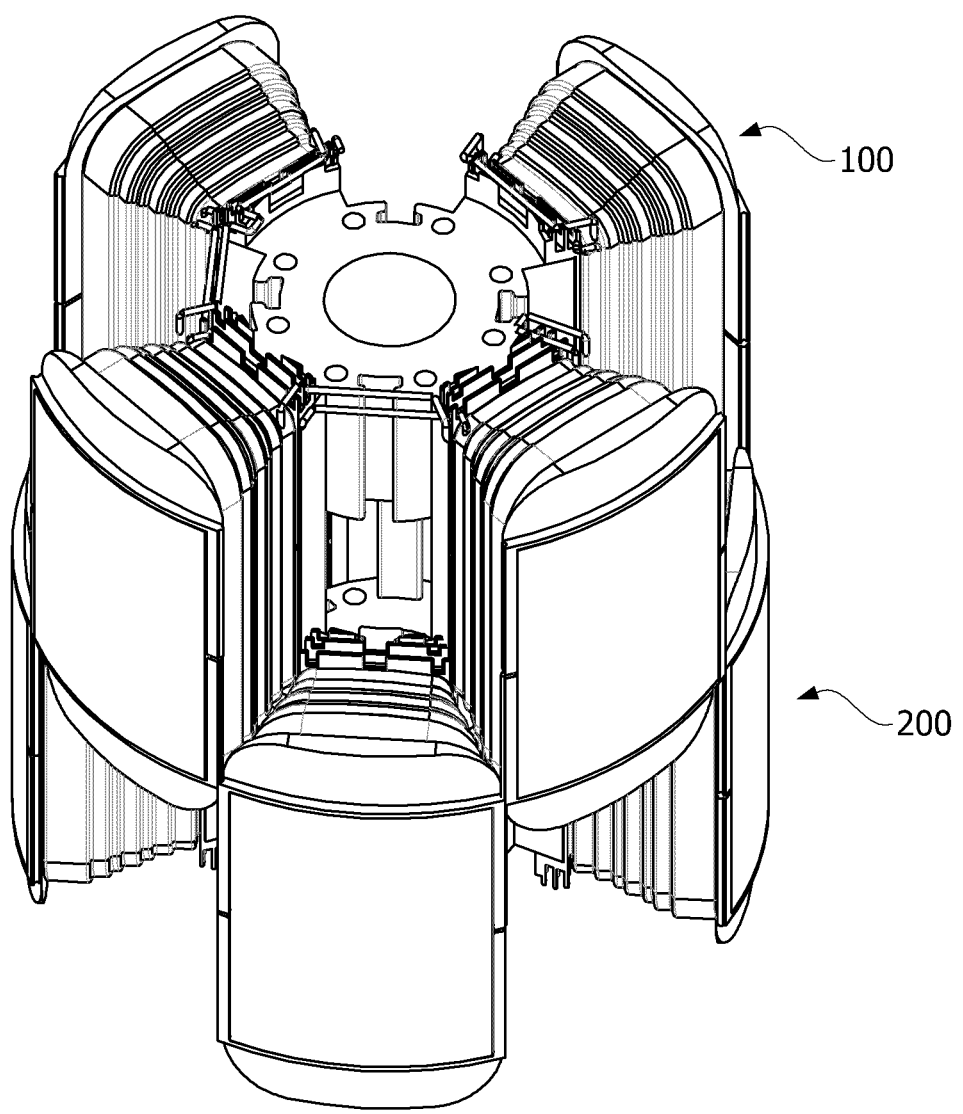
FIG. 16 is a view illustrating a state in which a coil is wound around each of the first rotor core and the second rotor core.

FIG. 16 is a view illustrating a state in which coils are wound around each of the first rotor core and the second rotor core.

As shown in FIG. 16, the first rotor core 100 and the second rotor core 200 may be assembled with each other after coils are wound therearound. Because gaps between the teeth around which the coils are wound are wide compared to when there is one rotor core, a space factor of the coils may be remarkably increased. Also, a task of winding the coils may be more easily performed. Particularly, since the winding task of the first rotor core 100 and the winding task of the second rotor core 200 are separately performed, a space into which a nozzle is inserted does not have to be secured during the winding tasks.

According to an embodiment, since winding tasks are separately performed for each of a plurality of rotor cores, winding spaces are closed by outer guides of insulators so that coils do not deviate from the winding spaces without having to secure spaces into which nozzles for the winding tasks are inserted such that separate members for filling the spaces into which the nozzles are inserted can be omitted and thus a manufacturing time and a manufacturing process can be reduced.

In addition, according to an embodiment, unlike a rotor in which teeth, around which coils are wound, are integrally formed, coils can be wound around divided teeth in which relatively wide winding spaces are secured such that a space factor of a coil increases and winding tasks are eased.

The rotor according to a an exemplary embodiment of the present invention and the motor having the same have been described above in detail with reference to the accompanying drawings.

The embodiments may be directed to a rotor capable of having increased torque by increasing a space factor of a coil and easing assembly thereof, and a motor having the same. The embodiments may be also directed to a rotor capable of having a reduced manufacturing time and manufacturing cost by removing a member that blocks an inlet of a nozzle between teeth of the rotor, and a motor having the same.

Objectives of the embodiments not limited to the above-mentioned objective, and other objectives of the embodiments will be clearly understood by one skilled in the art from the following description.

According to an aspect of the present invention, a rotor may include a first rotor core and a second rotor core that are axially stacked, the first rotor core includes a first core body and a first teeth protruding from an outer circumferential surface of the first core body, the second rotor core includes a second core body and a second teeth protruding from an outer circumferential surface of the second core body; wherein each of the first teeth includes a first extension protruding axially in a first direction past a first surface of the first core body, and each of the second teeth includes a second extension protruding axially in a second direction opposite the first direction past a first surface of the second core body, wherein the first extension includes a first protrusion provided on a first inner circumferential surface of the first extension, wherein the second extension includes a second protrusion provided on a second inner circumferential surface of the second extension, wherein the first protrusion includes a third inner circumferential surface of the first protrusion, wherein the second protrusion includes a fourth inner circumferential surface of the second protrusion, the third inner circumferential surface of the first protrusion, spaced apart radially inward from the second inner circumferential surface of the second extension, the fourth inner circumferential surface of the second protrusion, spaced apart radially inward from the first inner circumferential surface of the first extension.

The first core body includes a first groove provided on the outer circumferential surface of the first core body, the second core body includes a second groove provided on the outer circumferential surface of the second core body, wherein the first protrusion is configured to be inserted into the second groove, and the second protrusion is configured to be inserted into the first groove.

A first insulator coupled to the first rotor core and a second insulator coupled to the second rotor core, the first outer guide of the first insulator and the second outer guide of the second insulator are configured to abut each other.

A contact surface between the first outer guide and the second outer guide may be formed to be inclined.

A contact surface between the first outer guide and the second outer guide includes a convex region and a concave region.

A third protrusion may be formed at a contact surface of the first outer guide facing the second outer guide, and a third groove into which the third protrusion is configured to be inserted may be formed at a contact surface of the second outer guide facing the first outer guide.

The first groove, the second groove, the first protrusion, and the second protrusion extend along the axial direction, respectively.

The first protrusion is provided at the center of a first inner circumferential surface of the first extension in a circumferential direction, and the second groove is provided at the center of the outer circumferential surface of the second core body and located between adjacent second teeth in the circumferential direction.

The second protrusion is provided at the center of a second inner circumferential surface of the second extension in a circumferential direction, and the first groove is provided at the center of the outer circumferential surface of the first core body and located between adjacent first teeth in the circumferential direction.

The first protrusion has a width that decreases from an inner side of the first rotor core to an outer side of the first rotor core, and the second groove has a width that decreases from an inner side of the second rotor core to an outer side of the second rotor core, and the second protrusion has a width that decreases from an inner side of the second rotor core to an outer side of the second rotor core, and the first groove has a width that decreases from an inner side of the first rotor core to an outer side of the first rotor core.

According to another aspect of the present invention, there is provided a motor which includes a rotating shaft, a rotor through which the rotating shaft passes and a stator disposed at an outside of the rotor, wherein the rotor includes, a first rotor core and a second rotor core that are axially stacked, the first rotor core includes a first core body and a first teeth protruding from an outer circumferential surface of the first core body, the second rotor core includes a second core body and a second teeth protruding from an outer circumferential surface of the second core body, wherein each of the first teeth includes a first extension protruding axially in a first direction past a first surface of the first core body, and each of the second teeth includes a second extension protruding axially in a second direction opposite the first direction past a first surface of the second core body, wherein the first extension includes a first protrusion provided on a first inner circumferential surface of the first extension, wherein the second extension includes a second protrusion provided on a second inner circumferential surface of the second extension, wherein the first protrusion includes a third inner circumferential surface of the first protrusion, wherein the second protrusion includes a fourth inner circumferential surface of the second protrusion, the third inner circumferential surface of the first protrusion, spaced apart radially inward from the second inner circumferential surface of the second extension, the fourth inner circumferential surface of the second protrusion, spaced apart radially inward from the first inner circumferential surface of the first extension.

Hereinafter, exemplary embodiments of the present disclosure will be described in detail with reference to the accompanying drawings. Purposes, specific advantages, and novel features of the disclosure should be made clearer from exemplary embodiments and the following detailed descriptions in connection with the accompanying drawings. Terms and words used in this specification and claims are not to be interpreted as limited to commonly used meanings or meanings in dictionaries and should be interpreted as having meanings and concepts which are consistent with the technological scope of the disclosure with respect to the principle that the inventors have appropriately defined concepts of terms in order to describe the disclosure in the best way. In the description of the present disclosure, when it is determined that related well-known technologies unnecessarily obscure the gist of the present disclosure, the detailed descriptions thereof will be omitted.

Although the terms "first," "second," etc. may be used herein to describe various elements, these elements are not limited by these terms. These terms are only used to distinguish one element from another. For example, a first element could be termed a second element, and similarly, a second element could be termed a first element, without departing from the scope of the present disclosure. The term "and/or" includes any and all combinations of one or more of the associated listed items.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

DESCRIPTION OF SYMBOL

10: ROTOR
50: ROTATING SHAFT
100: FIRST ROTOR CORE
110: FIRST TEETH
111,211: ARM-TYPE BODY
112,212: BLOCKING PROTRUSION
113: FIRST EXTENSION
113a: FIRST INNER CIRCUMFERENTIAL SURFACE
113b: FIRST PROTRUSION
113ba: THIRD INNER CIRCUMFERENTIAL SURFACE
120: FIRST CORE BODY
121: FIRST GROOVE
200: SECOND ROTOR CORE
210: SECOND TEETH
213: SECOND EXTENSION
213a: SECOND INNER CIRCUMFERENTIAL SURFACE
213b: SECOND PROTRUSION
213ba: FOURTH INNER CIRCUMFERENTIAL SURFACE
220: SECOND CORE BODY
300: FIRST INSULATOR
310: BODY
320,420: OUTER GUIDE
330: INNER GUIDE
400: SECOND INSULATOR
500: THIRD PROTRUSION
600: THIRD GROOVE

What is claimed is:

1. A rotor comprising:
a first rotor core and a second rotor core that are axially stacked;
the first rotor core includes a first core body and a first teeth protruding from an outer circumferential surface of the first core body;
the second rotor core includes a second core body and a second teeth protruding from an outer circumferential surface of the second core body;
wherein each of the first teeth includes a first extension protruding axially in a first direction past a first surface of the first core body, and each of the second teeth includes a second extension protruding axially in a second direction opposite the first direction past a first surface of the second core body,
wherein the first extension includes a first protrusion provided on a first inner circumferential surface of the first extension,
wherein the second extension includes a second protrusion provided on a second inner circumferential surface of the second extension,
wherein the first protrusion includes a third inner circumferential surface of the first protrusion,
wherein the second protrusion includes a fourth inner circumferential surface of the second protrusion,
the third inner circumferential surface of the first protrusion, spaced apart radially inward from the second inner circumferential surface of the second extension, and
the fourth inner circumferential surface of the second protrusion, spaced apart radially inward from the first inner circumferential surface of the first extension.

2. The rotor of claim 1, wherein:
the first core body includes a first groove provided on the outer circumferential surface of the first core body,
the second core body includes a second groove provided on the outer circumferential surface of the second core body, and
wherein the first protrusion is configured to be inserted into the second groove, and the second protrusion is configured to be inserted into the first groove.

3. The rotor of claim 2, further comprising:
a first insulator coupled to the first rotor core, the first insulator including a first outer guide; and
a second insulator coupled to the second rotor core, the second insulator including a second outer guide,
the first outer guide of the first insulator and the second outer guide of the second insulator are configured to abut each other.

4. The rotor of claim 3, wherein a contact surface between the first outer guide and the second outer guide is formed to be inclined.

5. The rotor of claim 3, wherein a contact surface between the first outer guide and the second outer guide includes a convex region and a concave region.

6. The rotor of claim 3, wherein a third protrusion is formed at a contact surface of the first outer guide facing the second outer guide, and a third groove into which the third protrusion is configured to be inserted is formed at a contact surface of the second outer guide facing the first outer guide.

7. The rotor of claim 2, wherein the first groove, the second groove, the first protrusion, and the second protrusion extend along the axial direction, respectively.

8. The rotor of claim 7, wherein the first protrusion is provided at a center of the first inner circumferential surface of the first extension in a circumferential direction, and the second groove is provided at a center of the outer circumferential surface of the second core body and located between adjacent second teeth in the circumferential direction.

9. The rotor of claim 8, wherein the second protrusion is provided at a center of the second inner circumferential surface of the second extension in a circumferential direction, and the first groove is provided at a center of the outer circumferential surface of the first core body and located between adjacent first teeth in the circumferential direction.

10. The rotor of claim 9, wherein the first protrusion has a width that decreases from an inner side of the first rotor core to an outer side of the first rotor core, and the second groove has a width that decreases from an inner side of the second rotor core to an outer side of the second rotor core, and the second protrusion has a width that decreases from an inner side of the second rotor core to an outer side of the second rotor core, and the first groove has a width that decreases from an inner side of the first rotor core to an outer side of the first rotor core.

11. A motor comprising:
a rotating shaft;
a rotor through which the rotating shaft passes; and
a stator disposed at an outside of the rotor, wherein the rotor includes:
a first rotor core and a second rotor core that are axially stacked;
the first rotor core includes a first core body and a first teeth protruding from an outer circumferential surface of the first core body; and
the second rotor core includes a second core body and a second teeth protruding from an outer circumferential surface of the second core body,
wherein each of the first teeth includes a first extension protruding axially in a first direction past a first surface of the first core body, and each of the second teeth includes a second extension protruding axially in a second direction opposite the first direction past a first surface of the second core body,
wherein the first extension includes a first protrusion provided on a first inner circumferential surface of the first extension,
wherein the second extension includes a second protrusion provided on a second inner circumferential surface of the second extension,
wherein the first protrusion includes a third inner circumferential surface of the first protrusion,
wherein the second protrusion includes a fourth inner circumferential surface of the second protrusion,
wherein a distance from a center of the second core body to the third inner circumferential surface of the first protrusion is a first radial distance, a distance from a center of the first core body to the second inner circumferential surface of the second extension is a second radial distance, and the first radial distance is less than the second radial distance,
wherein a distance from the center of the first core body to the fourth inner circumferential surface of the second protrusion is a third radial distance, a distance from the center of the second core body to the first inner circumferential surface of the first extension is a fourth radial distance, and the third radial distance is less than the fourth radial distance.

* * * * *